Aug. 17, 1943.   W. C. HOWARD, JR   2,326,780
MECHANICAL COMPENSATOR
Filed June 25, 1941

INVENTOR.
William C. Howard Jr.
BY Ramsey, Kent, Chisholm & Lutz
Attorneys

Patented Aug. 17, 1943

2,326,780

UNITED STATES PATENT OFFICE 2,326,780

MECHANICAL COMPENSATOR

William C. Howard, Jr., Detroit, Mich.

Application June 25, 1941, Serial No. 399,653

25 Claims. (Cl. 123—90)

This invention relates to a mechanically operated compensator for eliminating clearance and compensating for wear or expansion of the parts of a machine. It is particularly adapted for silencing and maintaining the efficiency of the valve-operating mechanism of internal combustion engines, although it is capable of use wherever a device of this nature is desired.

A principal feature of the invention involves the use of a spring-biased compensating member as the main operating unit of the compensator, a plurality of sets of balls or other anti-friction devices cooperating with the compensating member to permit its movement for the desired compensating effect, but to lock it against movement when the device is transmitting the external work load. The parts are so arranged that upon release of the external load they unlock automatically and readjust themselves to new positions of the related parts, such as those resulting from thermal expansion, etc.

Devices have previously been proposed for this purpose which involved the use of a plunger spring-biased to take up clearance and locked by wedge means against return movement when under external load. But these devices have relied upon additional parts such as inertia members or separately operated stems, to unlock the wedge means, and have not been as simple and efficient as the structure of the present invention.

The invention provides a self-contained and self-operating unit that requires no modification of the related parts and hence can be installed with a minimum of expense and trouble.

While the examples illustrated and described herein show the invention as applied to a valve-tappet compensator for an internal combustion engine, the invention is not limited to that field, and various changes may be made in the disclosed structure without departing from the spirit of the invention as herein set forth and claimed.

In the drawing

Figure 1:
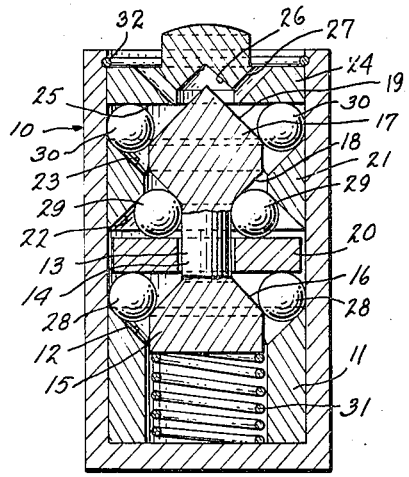
Figure 1 is a longitudinal section of a unit adapted for use as a valve tappet compensator.
Figure 2:
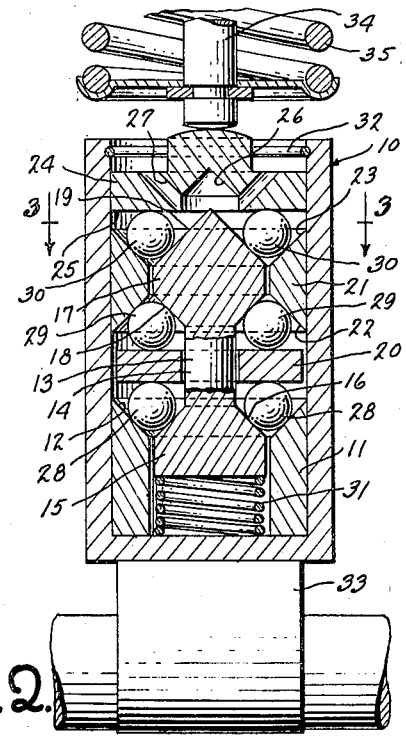
Figure 2 is a view in section similar to Figure 1, but showing the unit installed.
Figure 3:
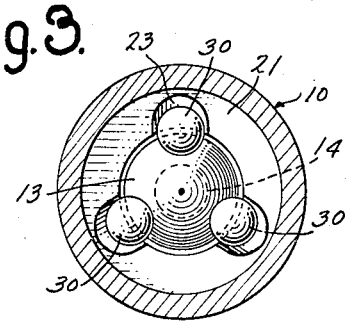
Figure 3 is a section on line 3—3 of Figure 2.

In Figures 1 to 3, which illustrate one embodiment of the invention, the numeral 10 indicates a cylindrical cup which forms the tappet body and housing. Inside the body and resting on the bottom thereof is a lower pressure body in the form of a ring 11, the upper end of which has three ball grooves 12 spaced equi-distant from each other and which form inwardly and downwardly sloping cam surfaces.

The plunger 13, which constitutes the compensating member, has a central stem portion 14 which carries fixed at its lower end a head 15 formed with a conical upper surface which provides cam surfaces 16 which slope outwardly and downwardly, and fixed at its upper end a head 17 formed on its under side with a conical surface which provides cam surfaces 18 which slope upwardly and outwardly. The upper side of head 17 is formed with a conical surface which forms outwardly and downwardly extending cam surfaces 19. A washer like part 20 is slidably mounted on stem 14 and forms a floating separator as will be subsequently described. The floating separator may be assembled on the plunger 13 in any convenient manner, as by originally forming either the ring or the plunger in two separate pieces which are welded together after the parts are assembled.

Numeral 21 indicates the intermediate ring, which forms an intermediate pressure body, and which has its lower side formed with three inwardly and upwardly extending ball grooves, forming cam surfaces 22, and its upper side formed with inwardly and downwardly extending ball grooves, forming cam surfaces 23.

The cap 24, which forms the top pressure body, has a flat surface 25 on its lower side and a central depression 26 which provides clearance for movement of the take-up plunger 13. Holes 27 permit insertion of a tool to trip the take-up plunger in a manner subsequently described. A typical unit measures approximately 1⅓ inches from the top of cap 24 to the bottom of the tappet body.

To transmit pressure between the operating parts with a minimum of friction ball rollers are used, arranged in three series. The lower series of rollers consists of three balls 28 which ride in the ball grooves 12 of ring 11 and against cam surfaces 16 of lower head 15, and have their upper portions in contact with the lower flat face of floating separator 20.

The middle series of rollers consists of three balls 29 which ride in the ball grooves 22 on the under side of intermediate pressure body 21 and against cam surfaces 18 of the upper head 17, and have their lower portions in contact with the upper flat face of floating separator 20.

The upper series of rollers consists of three balls 30 which ride in the ball grooves 23 on the upper side of intermediate pressure body 21 and against cam surfaces 19 of the upper head 17, and have their upper portions in contact with the lower flat face of cap 24.

It will be noticed in following the above description that each roller has three points of pressure contact, two of them on angularly disposed cam surfaces on two separate parts and the third on a flat face disposed at right angles to the vertical axis of the unit, the two cam surfaces being at acute angles to the flat face.

The plunger 13 is biased upwardly by a take-up spring 31 disposed between the plunger and the bottom of the tappet body, while upward movement of the parts when in free condition is limited by the split retainer ring 32. All parts of the unit are preferably formed of some suitable strong material such as steel.

Installation

Figure 1 shows a self-contained unit ready for installation in the valve-operating mechanism of an internal combustion engine, while Figure 2 shows the unit installed between a valve-operating cam 33 and a valve stem 34. In making this installation the valve is lifted or removed, as in installing a conventional tappet, and the unit is dimensioned so that when the valve is released the stem 34 engages cap 24 of the compensating unit with the full force of the valve spring. This force immediately locks the compensating unit in approximately the position of Figure 1 in a manner subsequently explained, but when a tool is inserted through one of the holes 27 and the plunger 13 is pushed down, the unit is tripped and the take-up action (described in the next section) then operates to move the parts to the normal starting position illustrated in Figure 2. In this position the valve is pressed against its seat by the full force of the valve spring 35 (a force of about 55 pounds in a specific case) minus the light pressure of the take-up spring 31 (which in the same case is 8 pounds). In assuming this normal starting position the parts have readjusted themselves so that the cap 24 is approximately midway of its permitted vertical travel, and there is direct contact between the cam and the bottom of the tappet body as well as between the cap 24 and the valve stem.

Action in taking up clearance

As stated previously, the unit operates to eliminate all clearance between the cam and the valve stem. This operation, which takes place when the unit is first installed as just described, as well as whenever clearance tends to arise for any reason such as wear or thermal contraction of the parts, takes place as follows:

Take-up spring 31 forces plunger 13 upwardly, thus forcing the upper series of rollers, 30, to roll upwardly and outwardly on grooves 23 of the intermediate race ring 21. During this upward movement of plunger 13 the intermediate ring 21 remains stationary. This is because the distance between the lower cam surfaces 16 and intermediate cam surfaces 18 of the plunger is fixed and all that the lower rollers 28 and intermediate rollers 29 can do is to readjust their positions, the lower rollers moving outwardly and upwardly while the intermediate rollers move inwardly and upwardly. This repositioning of the lower and intermediate rollers is accompanied by corresponding movement of floating separator 20, which is moved solely by pressure from the rollers. Since intermediate ring 21 remains stationary, the upward movement of plunger 13 causes the upper series of rollers to roll outwardly in radial directions along the lower flat face 25 of cap 24 and simultaneously to move upwardly on the inclined grooves 23. This movement, which causes upward movement of cap 24, continues until all clearance between the cap and the valve stem 34 has been taken up, or in other words, until there is no clearance at any point from the cam shaft to the valve stem, all of the points of contact being snugly engaged under pressure derived from the take-up spring.

During this action of taking up clearance the parts move from their positions in Figure 2 toward their positions in Figure 1, the latter view illustrating the positions after the unit has reached the limit of possible movement in the clearance-absorbing direction.

It will be clear from the above explanation that since the upper rollers 30 and the cam surfaces 19 and 23 translate upward movement of the plunger 13 into upward movement of the cap 24, these devices can be said to constitute translating means.

Locking action in assuming load

As soon as the cam 33 begins to apply pressure to the tappet body the compensator is placed under external pressure between the cam and the valve spring 35. This external pressure causes the parts of the compensator to automatically lock in substantially the position illustrated in Figure 2.

Experiments have demonstrated that the upper series of rollers 30 is not involved in this locking action, and it is believed that the locking action can most readily be explained by considering what occurs when the lower ring or pressure body 11 and the intermediate ring or pressure body 21 are forced toward each other. When this happens each of the cam surfaces 12 on the lower ring 11 and each of the cam surfaces 22 on the intermediate ring 21 form opposite walls of a constrictable wedge groove which, while being constricted, forces the lower rollers 28 and middle rollers 29 against the floating separator 20 and against the upper and lower heads of plunger 13. Since these heads are integral with the plunger they cannot separate and their cam surfaces 16 and 18 form opposite walls of a fixed wedge groove, the resistance of which causes the plunger 13, floating separator 20 and these two sets of rollers to become firmly locked as a single unit wedged between the sloping walls of the constrictable wedge groove formed by the inclined cam surfaces 12 and 22.

The wedging force just described is sufficient to resist any downward movement of plunger 13 under the downward load applied to the plunger from the upper series of rollers 30. This is apparently due to the fact that the upper rollers 30 divide their downward force equally between the intermediate pressure body 21 and the plunger 13, hence the force applied to maintain the wedging action described is equal to the force tending to move plunger 13 downwardly.

But when additional force is applied directly to plunger 13, as by inserting a tool through one of the openings 27 in the manner previously explained, the balance of forces is destroyed, and the wedge lock is broken, permitting the plunger to be moved down with a relatively small force.

However, barring such external interference with the normal operation of the parts, the locking force is proportionate to the load, and hence the device can positively transmit any load within the strength of the parts. In the typical case referred to the full load is a force of 125 pounds, which is the force of the valve spring at valve-opened position.

*Compensating for lengthening of valve parts*

The unit also compensates for lengthening of the valve parts, such as that resulting from expansion of the metal under increased temperature. This compensation occurs in the following manner.

When the compensator is placed under an external load, as recited in the previous section, the first part of the external pressure is taken up by elastic deformation of the parts, which, in the typical case mentioned, permits the compensator unit to give to the extent of approximately 0.001 inch up to the time the full load is assumed. This movement of cap 24 downward relative to the tappet body is transmitted downwardly through the top series of rollers 30 and since these rollers are supported equally on intermediate pressure body 21 and plunger 13, a downward movement of approximately 0.001 inch is transmitted to intermediate pressure body 21 and plunger 13. At this point, that is, after all yield of the parts has been taken up, the compensator locks as previously explained.

As the cam turns to valve-closing position and the external load on the compensator is released the parts unlock, freeing plunger 13 and permitting it to relocate itself under pressure of take-up spring 31.

This unlocking takes place slightly before the parts have returned to their original "installed" position. The apparent reason for this occurrence is that when the last part of the load is removed (the part that on the application of the load caused an elastic deformation of 0.001 inch) the elastic return (release of elastic deformation) causes the intermediate pressure body 21 to move upward relative to plunger 13, thus pressing rollers 30 inward against the plunger. This force of elastic return of the parts is strong enough to overcome spring 31, and it therefore moves the plunger down, unlocking the parts.

The upward movement of intermediate pressure body 21 is believed to result from the fact that when the unit is under the load, the load is carried within the unit by what might be visualized in Figure 2 as a column including the lower ring 11, lower rollers 28, floating separator 20, middle rollers 29, intermediate ring 21, and upper rollers 30. Elastic return acts mainly to permit a lengthening of this column, moving the intermediate ring 21 upward with the unlocking result previously explained.

As for the elastic return of the parts that react between the upper and lower heads of plunger 13, the upward reaction of middle rollers 29 on upper head 17 appears to be exactly balanced by the downward reaction of the lower rollers 28 on the lower head 15, hence these forces cancel out.

Since one-half of the upward movement of intermediate ring 21 is utilized to move the rollers 30 inward, and the plunger 13 downward, only one-half of this upward movement is transmitted to the cap 24. The result is that the unit unlocks when one-half of the total elastic deformation has been released, so that while the unit underwent an elastic deformation of 0.001 inch while assuming the load, in the unloading action the plunger 13 unlocks when the unit has undergone an overall elastic return of about 0.0005 inch.

The unit could, therefore, be 0.0005 inch shorter than it was originally, and if no change in length of the valve parts has taken place, there would be a tendency for a clearance of 0.0005 inch to appear between the end of the valve stem and the cap 24 of the unit. But this slight amount of potential clearance is kept from appearing by the spring 31 pressing the plunger 13 upwardly to maintain cap 24 in contact with the valve stem.

If instead, any change in relative positions of cam and valve stem has occurred, such as might be caused by thermal expansion of the valve stem, the spring 31 and plunger 13 merely permit the cap 24 to be held down to a new position somewhat lower than its original position, within the 0.0005 inch potential clearance.

It can be seen, therefore, that at the end of each load stroke the unit unlocks at a position 0.0005 inch shorter than its position on the previous stroke. The unit can therefore accommodate itself on each stroke to an increase of 0.0005 inch in the length of the parts. This back-off of the compensator is due to the action of elastic return in unlocking the parts, so it may appropriately be called "elastic back-off." While each working stroke results in a potential "elastic back-off" of 0.0005 inch, any of the back-off not used up by thermal expansion of the parts is immediately taken up by the spring 31 to prevent the occurrence at any time of actual clearance anywhere between the cam and the valve stem.

It will be understood from the above explanation that the unit acts by spring pressure to prevent the development of any clearance, that its locking parts provide for a positive drive when external pressure is applied, and that the "elastic back-off" permits the unit to adjust itself to new positions of the parts due to their lengthening under thermal expansion. Because all of these actions take place within the unit in response to external forces, the unit is entirely self-contained and self-operating, requiring no additional parts such as oil supply systems, inertia members, or operating rods. It therefore requires no modification of the other parts to which it is related, and can be very easily installed.

The advantages of the unit as applied to internal combustion engines, which will be self-evident to those skilled in the art, include the quiet engine operation that comes from the elimination of tappet clearance, and the increased power and prolongation of valve life that come from the positive cam action permitted by use of the unit.

The operation of the invention has been described above in connection with a certain unit designed for internal combustion engines, but those skilled in the art will understand that it is capable of considerable modification and adaptable for wide application. Thus, all of the cam surfaces are shown disposed at an angle of 45° to the vertical axis of the unit. This is the angle now preferred, but some variation of this angle is permissible. It has been found, however, that as the angle of the cam surfaces from the vertical axis becomes more acute the "elastic back-off" of the unit increases.

Each series of rollers is shown as including three rollers to keep the number of parts at a minimum while maintaining alinement, but any number of rollers may be used depending on the mechanical details of the particular installation, and any convenient arrangement may be used to secure the inclined cam surfaces.

For convenience the unit has been described and claimed in a position with the axis of the unit disposed vertically, although the unit may be installed in tilted or horizontal positions.

Figure 4:
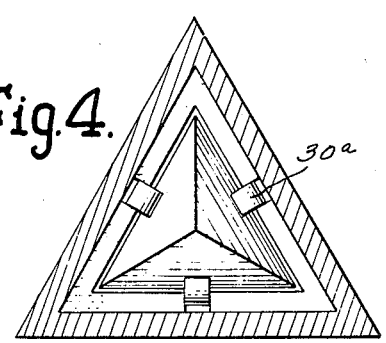
Figure 4 is a view similar to Figure 3, but illustrating the use of rollers instead of balls, and possible variation in the shape of the other parts.

In the example, the rolling units 28, 29 and 30 are balls, although cylindrical rollers or other suitable anti-friction devices may be used. Similarly, the housing, plunger, and related parts may be of shapes other than cylindrical. Thus, Figure 4 illustrates a form in which the housing, plunger, etc., are triangular in cross-section, and the rolling units 30a are cylindrical rollers.

Figure 5:
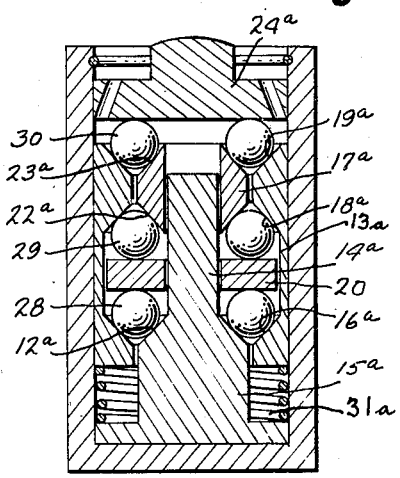
Figure 5 is a view similar to Figure 2, but illustrating diagrammatically a further modification.

Another possible variation is illustrated in Figure 5, which shows substantially a reversal of the parts of the form shown in Figures 1 to 3. In Figure 5 the compensating member is an outer cylindrical part 13a having interior cam surfaces 16a and 18a, which form the walls of the fixed wedge groove and carrying at its upper end the cam surfaces 19a.

The central plunger includes a stem 14a which carries a lower head 15a, which forms the lower pressure body, and carries cam surfaces 12a. An upper head 17a, which is slidably mounted on the upper end of stem 14a, forms the intermediate pressure body and carries lower cam surfaces 22a and upper cam surfaces 23a. The cam surfaces 12a and 22a form the opposite inclined walls of a constrictable wedge groove.

A floating separator 20 and series of balls 28, 29, and 30 are arranged and operate as in the form previously described. To facilitate assembly of the separator 20 within the cylindrical body 13a, the latter is preferably made in two parts secured together, as by welding, subsequent to assembly.

A spring 31a biases the compensating member upwardly, and tends to move cap 24a upwardly to eliminate clearance. The parts of this embodiment operate exactly like the corresponding parts of the embodiment previously described, it being clear that in both cases the fixed wedge groove is formed on the spring-biased compensating member, while the constrictable wedge groove is formed between the intermediate pressure body and the lower pressure body.

Since the housing plays no part in the operation of the device except to hold the parts of the unit in position, it may be dispensed with if the unit can be installed in a bore in some other part, or otherwise kept in assembled relation.

The operation of the unit is in no way dependent upon close tolerances, and hence it can be economically manufactured and assembled, and it has a long operating life, requiring no maintenance except a small supply of lubricant. The unit can accommodate itself to such wide variations in position of the valve stem as those resulting from reseating of the valve, etc.

The invention is, of course, not limited to use in internal combustion engines, but can be applied wherever a device is useful that will maintain a clearance-free fit regardless of wear or minor changes in length of the related parts.

I claim:

1. A mechanical compensator unit comprising: a lower pressure body; an upper pressure body; means biasing the upper and lower pressure bodies apart; means operable by the application of an external load to the unit to interpose a rigid, positive column of mechanical parts to carry the load; and means operable by the release of the external load from the unit to permit the upper and lower pressure members to readjust themselves to new positions closer together than they were originally.

2. A mechanical compensator comprising: a lower pressure body; an upper pressure body; spring means biasing the upper and lower pressure bodies apart; means including anti-friction devices cooperating with cam surfaces operable by the application of an external load to interpose a rigid column of mechanical parts to carry the load; and means operable by the release of the the external load to permit the upper and lower pressure members to readjust themselves to new positions closer together than they were originally.

3. A mechanical compensator comprising: a lower pressure body; an upper pressure body; springs means biasing the upper and lower pressure bodies apart; means including anti-friction devices cooperating with cam surfaces operable by the application of an external load to interpose a rigid column of mechanical parts to carry the load; and means including part of said rigid column operable by the release of the external load to permit the upper and lower pressure members to readjust themselves to new positions closer together than they were originally.

4. A mechanical compensator unit comprising: a lower pressure body; an upper pressure body; a compensating member; means biasing the compensating member toward the upper pressure member and tending to increase the distance between the upper and lower pressure members; means operable to lock the compensating member against movement when the upper and lower pressure members are pressed together by external load; and means operable by release of the external load to unlock the compensating member before the lower pressure member and upper pressure member fully return to their original positions, thus permitting the unit to shorten on the next application of external load.

5. A mechanical compensator unit comprising: a lower pressure body; an upper pressure body; a compensating member; a spring biasing the compensating member toward the top pressure member and tending to increase the distance between the top and bottom pressure members; locking means including anti-friction devices operating on cam surfaces for locking the compensating member to permit the unit to carry an external load; and unlocking means including anti-friction devices operating on cam surfaces for unlocking the compensating member and permitting the unit to shorten to accommodate itself to increased length of associated parts.

6. A mechanical compensator comprising: a compensating member having oppositely inclined cam surfaces forming a fixed wedge groove; a lower pressure body; an intermediate pressure body; the lower and intermediate pressure bodies carrying cam surfaces which are oppositely inclined and are movable relative to each other and form a constrictable wedge groove opposite said fixed wedge groove; a floating separator intersecting the fixed wedge groove and the constrictable wedge groove and having opposite faces parallel to each other; two series of anti-friction devices disposed between the fixed wedge groove and the constrictable wedge groove and in contact respectively with the opposite parallel faces of the floating separator; the parts being so disposed that when the lower and intermediate pressure bodies are moved toward each other by an external load the said two series of anti-friction devices and the separator become wedged between the fixed wedge groove and the constrictable wedge groove, locking the compensating member against movement.

7. A mechanical compensator comprising: an upper pressure body; a compensating member; a spring biasing the compensating member upwardly; means whereby upward movement of the compensating member causes upward movement of the upper pressure body; the compensating member having oppositely inclined cam surfaces forming a fixed wedge groove; a lower pressure body; an intermediate pressure body; the lower and intermediate pressure bodies carrying cam surfaces which are oppositely inclined and are movable relative to each other and form a constrictable wedge groove opposite said fixed wedge groove; a floating separator intersecting the fixed wedge groove and the constrictable wedge groove and having opposite faces parallel to each other; two series of anti-friction devices disposed between the fixed wedge groove and the constrictable wedge groove and in contact respectively with opposite parallel faces of the floating separator; the parts being so disposed that when the lower and intermediate pressure bodies are moved toward each other by an external load the said two series of anti-friction devices and the separator become wedged between the fixed wedge groove and the constrictable wedge groove, locking the compensating member against movement.

8. A mechanical compensator comprising: upper, intermediate and lower pressure bodies; a compensating member having oppositely inclined cam surfaces forming a fixed wedge groove; a spring biasing the compensating member in a direction to increase the distance between the upper and lower pressure members; the lower and intermediate pressure bodies carrying cam surfaces which are oppositely inclined and are movable relative to each other and form a constrictable wedge groove opposite said fixed wedge groove; a floating separator intersecting the fixed wedge groove and the constrictable wedge groove and having opposite faces parallel to each other; locking means adapted to be wedged between the fixed wedge groove and the constrictable wedge groove to lock the compensating member, said locking means including two series of anti-friction devices disposed, one on each side of said floating separator and in contact respectively with the parallel faces; and unlocking means for unlocking the compensating member, said unlocking means including anti-friction devices which contact cam surfaces on the upper side of the intermediate pressure member and cam surfaces on the upper side of the compensating member, said unlocking means permitting the unit to shorten to accommodate itself to increased length of associated parts.

9. A mechanical compensator unit comprising: a part having a stem, a top and a bottom head, the upper surface of the lower head having a conical portion tapering downwardly from the axis of the plunger, the under part of the upper head having a conical portion tapering upwardly from the axis of the plunger, said conical portions forming cam surfaces which constitute the sides of a first wedge groove; the upper part of upper head having a conical portion forming cam surfaces; a floating separator mounted on the stem; parts of the unit carrying cam surfaces which constitute a second wedge groove disposed opposite the first wedge groove; one of said wedge grooves being a fixed wedge groove and the other groove being a constrictable wedge groove; and locking means adapted to be wedged between the fixed and constrictable wedge grooves, the locking means including two series of anti-friction devices located on opposite sides of the floating separator respectively; and unlocking means including anti-friction devices which contact the cam surfaces on the upper part of the upper head.

10. A mechanical compensator comprising: upper, intermediate, and lower pressure bodies; a plunger having a stem, a top head and a bottom head, the two heads being fixed at opposite ends of the stem; a floating separator mounted on the stem; a spring biasing the plunger in a direction to increase the distance between the upper and lower pressure members; locking means adapted to be wedged between cam surfaces on the intermediate and lower pressure members, said locking means comprising balls contacting cam surfaces on the top and bottom heads of the plunger and contacting the floating separator; and unlocking means for unlocking the plunger, said unlocking means including the said balls and additional balls which contact cam surfaces on the upper side of the intermediate pressure member and on the upper side of the top head of the plunger, said unlocking means permitting the unit to shorten to accommodate itself to increased length of associated parts.

11. A mechanical compensator comprising: upper, intermediate and lower pressure members, the intermediate and lower pressure members having cam surfaces; a plunger having a top head and a bottom head, the two heads being connected by a stem, the upper part of each head having a conical portion tapering downwardly from the axis of the plunger, the under part of the upper head having a conical portion tapering upwardly from the axis of the plunger; a floating separator having flat upper and lower sides mounted on the stem; locking means adapted to be wedged between cam surfaces on the intermediate and lower pressure members, said locking means comprising balls contacting the conical surface on the under part of said top head and the upper flat side of the floating separator, and balls contacting the conical surface on the upper part of said bottom head and the lower flat side of the floating separator; unlocking means for unlocking the plunger, said unlocking means including the said balls and additional balls which contact the cam surfaces on the upper side of the intermediate pressure member and the conical portion on the upper side of said top head; and a spring biasing the plunger upwardly and operating through the conical portion on the upper side of said top head to roll the balls on a cam surface of the intermediate pressure member, thus increasing the distance between the upper and lower pressure mmbers.

12. A mechanical compensator unit comprising: a plunger having a top head and a bottom head, the two heads being connected by a stem; the top head of the plunger having on its upper side downwardly and outwardly inclined cam surfaces, and on its under side upwardly and outwardly inclined cam surfaces; the bottom head of the plunger having on its upper side downwardly and outwardly inclined cam surfaces; a lower pressure member surrounding the bottom head of the plunger and having downwardly and inwardly inclined cam surfaces; an intermediate pressure member surrounding the top head of the plunger and having on its under side upwardly and inwardly inclined cam surfaces and on its upper side downwardly and inwardly inclined cam surfaces; a top pressure member; a lower series of anti-friction members engaging the cam surfaces on the bottom head of the plunger and the cam surfaces on the lower pressure member; a middle series of anti-friction members engaging the cam surfaces on the under side of the intermediate pressure member and the cam surfaces on the under side of the top head of the plunger; a top series of anti-friction members engaging the cam surfaces on the upper side of the intermediate pressure member, and the flat surface on the under side of the top pressure body; a floating separator slidably mounted on the stem of the plunger and extending between the lower and middle series of anti-friction members; and a spring biasing the plunger upwardly.

13. A mechanical compensator comprising: a cylindrical part forming a compensating member and having an internal groove with sloping sides which form the walls of a fixed wedge groove, the upper surface of the cylindrical part carrying cam surfaces which slope inwardly and downwardly; a plunger located within the cylindrical part and comprising a stem having a lower head fixed at one end thereof, the lower head having on its upper part cam surfaces which slope outwardly and downwardly, and an upper head slidably mounted on the upper end of the stem, the upper head having on its under side cam surfaces which slope outwardly and upwardly, said cam surfaces on the upper and lower heads forming the walls of a constrictable wedge groove; the upper head having on its upper part cam surfaces which slope downwardly and outwardly; a floating separator surrounding the stem of the plunger and intersecting the fixed wedge groove and the constrictable wedge groove; and locking means adapted to be wedged between the fixed and constrictable wedge grooves, the locking means including two series of anti-friction devices located on opposite sides of the floating separator respectively; unlocking means including anti-friction devices which contact the cam surfaces on the upper part of the upper head and the upper part of the cylindrical compensating member; an upper pressure body; and a spring biasing the cylindrical compensating member upwardly to move the upper pressure body upwardly.

14. A mechanical compensator comprising: lower, intermediate and upper pressure bodies; a compensating member spring-biased toward the upper pressure body; a first set of anti-friction devices engaging cam surfaces on the compensating member and the intermediate pressure body and a flat surface on the upper pressure body, whereby movement of the compensating member under influence of the spring causes the upper pressure body to move away from the intermediate pressure body; the compensating member having oppositely inclined cam surfaces forming a fixed wedge groove; the lower and intermediate pressure bodies carrying cam surfaces inclined oppositely to, and movable relative to, each other and which form a constrictable wedge groove opposite said fixed wedge groove; a floating separator in the form of a disc having flat upper and lower faces intersecting the fixed and constrictable wedge grooves, second and third sets of anti-friction devices disposed on opposite sides respectively of the floating separator and between the fixed and constrictable wedge grooves, whereby when an external load is applied to the compensator the second and third sets of anti-friction devices become wedged between the fixed and constrictable wedge grooves, locking the compensating member against movement, and forming a rigid column comprising the pressure bodies, the anti-friction devices and the floating separator; the parts being so disposed that when the locking parts are released the compensator is permitted to reassume the load with an effective length shorter than it was at the last locking operation.

15. A mechanical compensator unit comprising: a lower pressure body; an upper pressure body; means biasing the upper and lower pressure bodies apart; means operable by the application of an external load to interpose a rigid column of mechanical parts to carry the load; and means operable by resilient expansion of some of the parts of the compensator to unlock the rigid column.

16. A mechanical compensator comprising: lower, intermediate and upper pressure bodies; a compensating member spring-biased toward the upper pressure body; translating means for translating upward movement of the compensating member into movement of the upper pressure body away from the lower pressure body, the translating means including a first set of anti-friction devices; locking means for locking the compensating member, the locking means including second and third sets of anti-friction devices separated from each other by a floating separator; each of said anti-friction devices cooperating with a flat surface disposed at right angles to the axis of the compensator and with two surfaces opposed to each other, the two opposed surfaces being formed on separate parts respectively, and being disposed at angles which are acute to their cooperating flat surface.

17. A mechanical compensator comprising: lower, intermediate and upper pressure bodies; a compensating member spring-biased toward the upper pressure body; translating means for translating upward movement of the compensating member into movement of the upper pressure body away from the lower pressure body, the translating means including a first set of anti-friction devices; locking means for locking the compensating member, the locking means including second and third sets of anti-friction devices separated from each other by a floating separator; each of said anti-friction devices cooperating with a flat surface disposed at right angles to the axis of the compensator and with two surfaces opposed to each other, the two opposed surfaces being formed on separate parts respectively, the said separate parts being movable relatively to each other, and the said opposed surfaces being disposed at angles which are acute to their cooperating flat surfaces.

18. A locking device for locking two parts movable relatively to each other which comprises: oppositely inclined cam surfaces on one of said movable parts forming sides of a fixed wedge groove; oppositely inclined cam surfaces carried by the other of said movable parts forming sides of a movable wedge groove; a floating separator intersecting the fixed and movable wedge grooves; and two series of anti-friction devices located on opposite sides of the floating separator, respectively.

19. A locking device for locking two parts movable relatively to each other which comprises: oppositely inclined cam surfaces on one of said movable parts forming sides of a fixed wedge groove; oppositely inclined cam surfaces carried by the other of said movable parts forming sides of a movable wedge groove; a floating separator in the form of a washer having opposite flat faces parallel to each other, the separator being disposed in a position intersecting the fixed and movable wedge grooves; and two series of anti-friction devices located on opposite sides of the floating separator respectively, each of said anti-friction devices cooperating with a flat face of the floating separator and with an inclined face of the fixed wedge groove and with an inclined face of the movable wedge groove.

20. A mechanical compensator comprising: a compensating member having oppositely inclined cam surfaces forming a fixed wedge groove; a lower pressure body; an intermediate pressure body; the lower and intermediate pressure bodies carrying cam surfaces which are oppositely inclined and are movable relative to each other and form a constrictable wedge groove opposite said fixed wedge groove; a floating separator having opposite flat faces; first anti-friction means in contact with one of said flat faces of the floating separator; second anti-friction means in contact with the other of said flat faces of the floating separator; the first and second anti-friction means and the floating separator being disposed between the fixed wedge groove and the constrictable wedge groove; the parts being so arranged that when the lower and intermediate pressure bodies are moved toward each other by an external load the said two anti-friction means and the separator become wedged between the fixed wedge groove and the constrictable wedge groove, locking the compensating member against movement.

21. A mechanical compensator comprising: an upper pressure body; a compensating member; means biasing the compensating member upwardly; means whereby upward movement of the compensating member causes upward movement of the upper pressure body; the compensating member having oppositely inclined cam surfaces forming a fixed wedge groove; a lower pressure body; an intermediate pressure body; the lower and intermediate pressure bodies carrying cam surfaces which are oppositely inclined and are movable relative to each other and form a constrictable wedge groove opposite said fixed wedge groove; a floating separator having opposite flat faces; first anti-friction means in contact with one of said flat faces of the floating separator; second anti-friction means in contact with the other of said flat faces of the floating separator; the first and second anti-friction means and the floating separator being disposed between the fixed wedge groove and the constrictable wedge groove; the parts being so arranged that when the lower and intermediate pressure bodies are moved toward each other by an external load the said two anti-friction means and the separator become wedged between the fixed wedge groove and the constrictable wedge groove, locking the compensating member against movement.

22. A mechanical compensator comprising: upper, intermediate and lower pressure bodies; a compensating member having oppositely inclined cam surfaces forming a fixed wedge groove; a spring biasing the compensating member in a direction to increase the distance between the upper and lower pressure members; the lower and intermediate pressure bodies carrying cam surfaces which are oppositely inclined and are movable relative to each other and form a constrictable wedge groove opposite said fixed wedge groove; a floating separator having opposite flat faces; locking means adapted to be wedged between the fixed wedge groove and the constrictable wedge groove to lock the compensating member, said locking means including anti-friction means disposed on opposite sides of the floating separator; and unlocking means for unlocking the compensating member, said unlocking means comprising anti-friction means in contact with cam means on the upper side of the intermediate pressure member and with cam means on the upper side of the compensating member, said unlocking means permitting the unit to shorten to accommodate itself to increased length of associated parts.

23. A mechanical compensator comprising: lower, intermediate and upper pressure bodies; a compensating member spring-biased toward the upper pressure body; translating means for translating upward movement of the compensating member into movement of the upper pressure body away from the lower pressure body, the translating means including first anti-friction means; locking means for locking the compensating member, the locking means including second and third anti-friction means separated from each other by a floating separator; each of said anti-friction means cooperating with a flat surface disposed at right angles to the axis of the compensator and with two surfaces opposed to each other, the two opposed surfaces being formed on separate parts, respectively, and being disposed at angles which are acute relative to their cooperating flat surfaces.

24. A locking device for locking two parts movable relatively to each other which comprises: oppositely inclined cam surfaces on one of said movable parts forming sides of a fixed wedge groove; oppositely inclined cam surfaces carried by the other of said movable parts forming sides of a movable wedge groove; a floating separator intersecting the fixed and movable wedge grooves; anti-friction means located on one side of the floating separator; and another anti-friction means located on the other side of the floating separator.

25. A locking device for locking two parts movable relatively to each other which comprises: oppositely inclined cam surfaces on one of said movable parts forming sides of a fixed wedge groove; oppositely inclined cam surfaces carried by the other of said movable parts forming sides of a movable wedge groove; a floating separator in the form of a washer having opposite flat faces parallel to each other, the separator being disposed in a position intersecting the fixed and movable wedge grooves; anti-friction means located on one side of the floating separator; and another anti-friction means located on the other side of the floating separator; each of said anti-friction means cooperating with a flat face of the floating separator and with an inclined face of said fixed wedge groove and with an inclined face of said movable wedge groove.

WILLIAM C. HOWARD, Jr.